United States Patent [19]

Cook et al.

[11] Patent Number: 4,680,059

[45] Date of Patent: Jul. 14, 1987

[54] BUILDING MATERIAL

[75] Inventors: David J. Cook; Nam W. Lim, both of St. Ives, Australia

[73] Assignee: Unisearch Limited, Kensington, Australia

[21] Appl. No.: 656,725

[22] Filed: Oct. 1, 1984

[30] Foreign Application Priority Data

Sep. 30, 1983 [AU] Australia ............................... PG1660

[51] Int. Cl.$^4$ ................................................ C04B 7/34
[52] U.S. Cl. ..................................... 106/120; 252/62
[58] Field of Search ........................... 106/120; 252/62

[56] References Cited

U.S. PATENT DOCUMENTS

| 122,880 | 1/1872 | Dean | 106/120 |
|---|---|---|---|
| 3,501,324 | 3/1970 | Kubo | 106/120 |
| 3,574,816 | 4/1971 | Abbdellatif | 106/120 |

FOREIGN PATENT DOCUMENTS

| 1587389 | 3/1970 | France | 106/120 |
|---|---|---|---|
| 45-7997 | 3/1970 | Japan | 106/120 |
| 59-141452 | 8/1984 | Japan | 106/120 |

Primary Examiner—William R. Dixon, Jr.
Assistant Examiner—Steven Capella
Attorney, Agent, or Firm—Holman & Stern

[57] ABSTRACT

The present invention is directed toward a building material comprising from 20 to 70% of a reactive amorphorous silicate material which has been reacted with an aqueous solution of an iron salt, from 20 to 60% by weight of a filler containing reactives polyvalent cations, from 10 to 50% by weight of lime and from 0 to 10% by weight of reinforcing fillers, and to a method of producing same.

15 Claims, No Drawings

BUILDING MATERIAL

The present invention relates to an improved building material and more particularly to a building material which may be used in the formation of bricks and like building elements.

The present invention consists in a building material comprising from 20 to 70% of a reactive amorphous silicate material which has been reacted with an aqueous solution of an iron salt, from 20 to 60% by weight of a filler containing reactive polyvalent cations, from 10 to 50% by weight of lime and from 0 to 10% by weight of reinforcing fillers; all based on the total weight of the composition.

The reactive amorphous silicate is preferably obtained by burning rice husks, however, the heat treatment of other siliceous materials will give rise to reactive amorphous silicates useful in the present invention. This heat treatment is preferably carried out at a temperature of 400° C. or above, more preferably 600° C. for a time sufficient to completely ash the rice husks, say from 5 to 30 minutes.

The rice husks are preferably soaked in the aqueous solution of an iron salt prior to being burnt. It has been found that the heat treatment of the rice husks in the presence of the iron salt gives rise to ferrosilicate species which are highly reactive with polyvalent cations.

The husks are preferably soaked in a solution containing from 0.5 to 15% by weight of an iron salt. This salt is most preferably ferric chloride however any other soluble iron salt could be used such as iron carbonate or iron orthophosphate. The rice husks are preferably soaked in the solution until saturated and then dried, say at a temperature between 75° C. and 150° C., prior to being burned.

The filler may be any suitable soil or waste material containing reactive polyvalent cations. It is believed that the cations present in the waste material will react with the ferrosilicate ions in the rice husks or other siliceous material to form insoluble crystalline materials which bind the ingredients of the building material according to this invention. The filler preferably contains reactive aluminium or calcium cations though other cations such as magnesium, barium and the like may also be present either alone or in combinations with other cation species.

The filler material may be rendered reactive by heating to a temperature of more than 400° C., preferably about 550° C. to about 700° C. This heating step may be carried out deliberately to render the filler reactive, as would be the case with soil for instance, or may be a part of the process leading to the formation of a waste material which is used as the filler, as would be the case with slag or fly ash.

Preferably the filler material is selected from the group comprising soils, red mud derived from the processing of bauxite, kaolin, spent oil shale, fly ash, and blast furnace slag or combinations thereof. Other similar siliceous materials containing reactive polyvalent cations may also be used as filler materials.

The reactive amorphous silicate material and the filler must be reacted with lime (calcium hydroxide). When these three materials are reacted together the resultant building material has been found to contain crystals of calcium silicate hydrate, calcium alumina hydrate and calcium alumina silicate which are also present in similar materials formed without treatment of the siliceous material with an iron salt. The building material according to this invention has additionally been found to contain crystals of hexa-calcium aluminoferrite, tetracalcium aluminate hydrate and calcium alumina ferrosilicate which are not found in such untreated materials. It is believed that the presence of these additional crystal species contributes to the improved compressive strengths found in the building materials according to this invention.

The building material according to this invention may additionally contain a fibrous reinforcing material. Steel fibers and glass fibers are the preferred reinforcing material however fibers of other materials, such as cellulose, mineral wool, ceramic wool or glass wool or combinations thereof may also be used. The most preferred reinforcing fibers are alkaline resistant glass rovings of a filament diameter of 10 to 12 microns and coarse grade steel fiber chopped to lengths of from ¼" to ½".

The abovementioned ingredients are preferably intimately mixed together, as in a ball mill or like mixer, and water added. The resultant mixture is then preferably compressed and allowed to cure. The water is preferably added in an amount of 10 to 60%, preferably 35 to 40%, by weight of the silicate material, the filler and the lime. If reinforcing fibers are to be added this preferably occurs after the mixing of the other ingredients with water.

The ingredients in the building material are present in the following proportions by weight:
20 to 70% reactive amorphous silicate material
20–60% filler
10–50% lime
0–10% reinforcing fibre The reactive amorphous silicate is preferably present in an amount of 20 to 40%, most preferably 20 to 30%. The proportion of filler may be varied over a wide range and the most preferred amount of filler will depend upon the filler being used. In general terms however it may be said that an amount of 30 to 55% of filler is preferred. In particular it has been found that materials such as kaolin and red mud may be used in lower amounts, say about 30%, then soils and waste materials such as slag and fly ash which are preferably used in amounts of up to 55%.

The lime is preferably used in an amount of from 20 to 30%. The fibers are preferably present in an amount of 0.5 to 3% of the dry matter content of the building material, i.e. the ingredients prior to the addition of water, most preferably 1.5 to 2% of that dry matter content.

The ingredients of the building material are preferably compressed in a mould or extrusion die. Preferably they are subject to compressive forces of from 40 to 80 kN, most preferably 55 to 65 kN.

Hereinafter given by way of example are preferred embodiments illustrating the present invention.

EXAMPLE 1

The materials were mixed on a weight basis (from 35 to 45% by weight of the dry ingredients except reinforcing fiber, when present). After being mixed the materials were ground in a ball mill for four hours. The water was added to the mix. The moist mixture was then compacted.

For compaction a small cylindrical mould was used. This mould was 50 mm high and had a diameter of 25 mm. The moist mixture was compacted in four layers by several blows of an 8 mm iron bar. Following compaction each specimen was pressed up to a pressure of 60 kN and the specimens demoulded. The specimens were kept in plastic bags and then cured in an oven dryer at a temperature of 35° C. for seven days and the compressive strength determined.

The rice husks used were soaked in a ferric chloride (FeCl$_3$) solution (2.5% concentration) overnight in a suitable container and then dried at 105° C. The treated rice husks were then burned at 600° C. for about 10 minutes in an electric muffle furnace.

A comparison was made in this example between rice husks treated with ferric chloride and rice husks which had been burned but without ferric chloride treatment. The formulation used was as follows:

| | |
|---|---|
| Rice husk ash (RHA) | 30% by weight |
| Heat treated Home Rule kaolin (HT-HR) | 30% by weight |
| Lime | 40% by weight |

The results obtained were as follows:
(a) Chemical analysis of the ash by weight

| | RHA treated with FeCl$_3$ | Untreated RHA |
|---|---|---|
| SiO$_2$ | 65.4% | 77.6% |
| Al$_2$O$_3$ | 0.8% | 0.4% |
| Fe$_2$O$_3$ | 9.1% | 0.2% |

(b) Physical and mineralogical properties

| | RHA treated with FeCl$_3$ | Untreated RHA |
|---|---|---|
| Free lime content | 19.0% | 25.0% |
| X-ray diffraction analysis | Ca Si H(II) | Ca Si H(II) |
| | Ca Al H$_{10}$ | Ca Al H$_{10}$ |
| | Ca$_4$ Al H$_{13}$ | trace |
| | Ca$_6$ Al$_2$ Fe | — |
| | SiO$_2$ | SiO$_2$ |
| | — | Ca (OH)$_2$ |
| Energy dispersion analysis | Ca | Ca |
| | Ca Al Si | Ca Al Si |
| | Ca Al Fe Si | — |
| | Ca Si | Ca Si |
| Compressive strength (MPa) | 20.0 | 13.5 |
| Density (g/cc) | 1.64 | 1.62 |

This comparison shows the significant strength improvement obtained by the use of ferric chloride treated rice husk ash. It showed that the presence of the iron ions produced crystallisation of hexacalcium aluminoferrite (Ca$_6$Al$_2$Fe) and tetracalcium aluminate hydrate (Ca$_4$AlH$_{13}$) which are believed to have contributed to the significant increase in compressive strength of the ferric chloride treated product.

EXAMPLE II

The procedure of Example I was repeated with the following formulations and results:

| | 1 | 2 | 3 | 4 |
|---|---|---|---|---|
| RHA-Ferric Chloride treated (%) | 30 | 40 | 35 | 25 |
| HT-HR (%) | 30 | 40 | 35 | 25 |
| Lime (%) | 40 | 20 | 30 | 50 |
| Density (g/cc) | 1.64 | 1.60 | 1.68 | 1.63 |
| Compressive strength (MPa) | 18.0 | 22.2 | 25.3 | 13.5 |

It can be seen that in this example the compressive strength decreased outside the range of lime contents between 20 and 30%.

EXAMPLE III

The procedure of Example 1 was repeated with the following formulations and results:

| | 1 | 2 | 3 | 4 | 5 |
|---|---|---|---|---|---|
| RHA-Fe (%) | 30 | 30 | 30 | 30 | 30 |
| HT-HR (%) | 30 | 30 | 30 | 30 | 30 |
| Lime (%) | 40 | 40 | 40 | 40 | 40 |
| Glass Fibre (%) | — | 1.0 | 1.5 | 2.0 | 3.0 |
| Density (g/cc) | 1.64 | 1.61 | 1.60 | 1.60 | 1.54 |
| Compressive strength (MPa) | 18.0 | 18.2 | 21.0 | 20.5 | 16.0 |

It can be seen from this example that maximum compressive strengths were obtained at glass fiber contents of between 1.5 and 2.0%.

EXAMPLE IV

The procedure of Example I was repeated using the following formulations which include a representative sample of alternative filler materials. The soils used were:

(a) Home Rule Kaolin (HR) this soil is approximately 95% kaolin (b) Red Earth Soil (RE) this soil is mostly a kaolinite mineral containing illitic clay minerals and a considerable amount of fine sand (c) Condoblin Soil (CS) this soil has a clay content of 20 to 50% with a high proportion of illitic clay minerals. It also contains a high amount of find sand (d) Red Mud (RM) this is a waste product of Bauxite refining. Its mineralogical constituents are not known but it has a considerable content of Fe$_2$O$_3$ (35–40%), Al$_2$O$_3$ (20–25%) and SiO$_2$ (15–20%)

The results were as follows:

| | 1 | 2 | 3 | 4 |
|---|---|---|---|---|
| RHA-Fe % | 30 | 30 | 30 | 30 |
| HT-HR % | 30 | — | — | — |
| HT-CS | — | 30 | — | — |
| HT-RE % | — | — | 30 | — |
| HT-RM % | — | — | — | 30 |
| Lime % | 40 | 40 | 40 | 40 |
| Density (g/cc) | 1.64 | 1.78 | 1.76 | 1.73 |
| Compressive strength (MPa) | 18.0 | 26.0 | 27.0 | 32.0 |

It can be seen that there is a difference in compressive strength developed by the different filler materials. The substitution of sandy soils for kaolinite materials improved the compressive strength but to a lesser extent than the red mud.

EXAMPLE V

The procedure of Example 1 was repeated with the following formulations and results:

| | 1 | 2 | 3 | 4 |
|---|---|---|---|---|
| (a) | | | | |
| RHA-Fe (%) | 37.5 | 35.0 | 32.5 | 30.0 |
| HT-RM (%) | 37.5 | 35.0 | 37.5 | 30.0 |
| Lime (%) | 25.0 | 30.0 | 35.0 | 40.0 |
| Water (%) | 0.4 | 0.4 | 0.4 | 0.4 |
| Glass Fibre (%) | 1.5 | 1.5 | 1.5 | 1.5 |
| Density (g/cc) | 1.81 | 1.76 | 1.75 | 1.72 |
| Compressive Strength (MPa) | 37.0 | 26.8 | 29.1 | 32.1 |

-continued

|  | 1 | 2 | 3 | 4 |
|---|---|---|---|---|
| Tensile Strength (MPa) | 6.0 | 4.2 | 4.1 | 4.5 |
| (b) |  |  |  |  |
| RHA-Fe (%) | 37.5 | 35.0 | 32.5 | 30.0 |
| HT-RE (%) | 37.5 | 35.0 | 32.5 | 30.0 |
| Lime (%) | 25.0 | 30.0 | 35.0 | 40.0 |
| Water (%) | 0.4 | 0.4 | 0.4 | 0.4 |
| Glass Fibre (%) | 1.5 | 1.5 | 1.5 | 1.5 |
| Density (g/cc) | 1.72 | 1.73 | 1.71 | 1.74 |
| Compressive Strength (MPa) | 27.0 | 25.1 | 21.6 | 25.3 |
| Tensile Strength (MPa) | 3.8 | 2.9 | 2.1 | 2.7 |
| (c) |  |  |  |  |
| RHA-Fe (%) | 37.5 | 35.0 | 32.5 | 30.0 |
| HT-CS (%) | 37.5 | 35.0 | 32.5 | 30.0 |
| Lime (%) | 25.0 | 30.0 | 35.0 | 40.0 |
| Water (%) | 0.4 | 0.4 | 0.4 | 0.4 |
| Glass Fibre (%) | 1.5 | 1.5 | 1.5 | 1.5 |
| Density (g/cc) | 1.76 | 1.73 | 1.76 | 1.72 |
| Compressive Strength (MPa) | 26.0 | 25.3 | 29.0 | 26.3 |
| Tensile Strength (MPa) | 3.2 | 2.7 | 3.6 | 3.6 |

The above compresive strengths are given at seven days and show how the compresive strength of the ferric chloride treated formulation of sample 1 and sample 4 of each Example IV(a), (b), and (c) above change with time.

EXAMPLE VI

The procedure of Example I was repeated with the following formulations to investigate the effect of varying the water content of the mixture and varying the forming pressure.

The formulations used and results obtained were as follows:

|  |  | 1 | 2 | 3 | 4 | 5 | 6 |
|---|---|---|---|---|---|---|---|
| (a) |  |  |  |  |  |  |  |
| RHA-Fe (%) |  | 37.5 | 35.0 | 37.5 | 35.0 | 37.5 | 35.0 |
| ALCOA Red Mud (%) |  | 37.5 | 35.0 | 37.5 | 35.0 | 37.5 | 35.0 |
| HT-HR (%) |  | — | 5.0 | — | 5.0 | — | 5.0 |
| Lime (%) |  | 25.0 | 25.0 | 25.0 | 25.0 | 25.0 | 25.0 |
| Glass Fibre (%) |  | 1.5 | 1.5 | 1.5 | 1.5 | 1.5 | 1.5 |
| Water (w/c) |  | 0.35 | 0.35 | 0.40 | 0.40 | 0.45 | 0.45 |
| Pressure (KN) |  | 40 | 40 | 40 | 40 | 40 | 40 |
| Compressive | 7 days | 16.0 | 33.0 | 29.0 | 31.0 | 11.0 | 16.0 |
| Strength | 14 days | 17.0 | 31.0 | 29.5 | 32.0 | 15.0 | 16.0 |
| (MPa) | 28 days | 19.5 | 35.0 | 31.0 | 34.0 | 12.0 | 18.5 |
| Tensile Strength |  |  |  |  |  |  |  |
| (MPa) | 7 days | 2.3 | 4.3 | 4.1 | 4.4 | 1.5 | 2.5 |
| Density (g/cc) | 7 days | 1.79 | 1.86 | 1.78 | 1.82 | 1.77 | 1.8 |
| (b) |  |  |  |  |  |  |  |
| RHA-Fe (%) |  | 37.5 | 35.0 | 37.5 | 35.0 | 37.5 | 35.0 |
| ALCOA Red Mud (%) |  | 37.5 | 35.0 | 37.5 | 35.0 | 37.5 | 35.0 |
| HT-HR (%) |  | — | 5.0 | — | 5.0 | — | 5.0 |
| Lime (%) |  | 25.0 | 25.0 | 25.0 | 25.0 | 25.0 | 25.0 |
| Glass Fibre (%) |  | 1.5 | 1.5 | 1.5 | 1.5 | 1.5 | 1.5 |
| Water (w/c) |  | 0.35 | 0.35 | 0.40 | 0.40 | 0.45 | 0.45 |
| Pressure (KN) |  | 60 | 60 | 60 | 60 | 60 | 60 |
| Compressive | 7 days | 26.0 | 32.0 | 25.0 | 24.0 | 12.0 | 6.0 |
| Strength | 14 days | 24.0 | 33.0 | 25.5 | 29.0 | 15.0 | 8.0 |
| (MPa) | 28 days | 30.0 | 39.0 | 28.0 | 33.0 | 10.0 | 12.0 |
| Tensile Strength |  |  |  |  |  |  |  |
| (MPa) | 7 days | 3.6 | 4.7 | 3.2 | 3.3 | 1.6 | 1.3 |
| Density (g/cc) | 7 days | 1.79 | 1.86 | 1.78 | 1.82 | 1.77 | 1.80 |
| (c) |  |  |  |  |  |  |  |
| RHA-Fe (%) |  | 37.5 | 35.0 | 37.5 | 35.0 | 37.5 | 35.0 |
| ALCOA Red Mud (%) |  | 37.5 | 35.0 | 37.5 | 35.0 | 37.5 | 35.0 |
| HT-HR (%) |  | — | 5.0 | — | 5.0 | — | 5.0 |
| Lime (%) |  | 25.0 | 25.0 | 25.0 | 25.0 | 25.0 | 25.0 |
| Glass Fibre (%) |  | 1.6 | 1.5 | 1.5 | 1.5 | 1.5 | 1.5 |
| Water (w/c) |  | 0.35 | 0.35 | 0.40 | 0.40 | 0.45 | 0.45 |
| Pressure (KN) |  | 80 | 80 | 80 | 80 | 80 | 80 |
| Compressive | 7 days | 27.0 | 36.0 | 22.0 | 16.0 | 12.0 | 6.0 |
| Strength | 14 days | 25.0 | 35.0 | 22.0 | 17.0 | 14.0 | 10.0 |
| (MPa) | 28 days | 29.0 | 37.0 | 26.0 | 23.0 | 13.0 | 12.0 |
| Tensile Strength |  |  |  |  |  |  |  |
| (MPa) | 7 days | 3.9 | 5.2 | 2.9 | 2.1 | 1.7 | 0.8 |
| Density (g/cc) | 7 days | 1.82 | 1.86 | 1.80 | 1.80 | 1.75 | 1.73 |

It will be seen that with an increase in forming pressure there is a gradual increase in strength and density only at low water content. It was found however that though a mass with a low water content can be densely shaped under an increased forming pressure there is a tendency for the formed body to develop internal laminations or to develop a twisted shape when extruded.

In general high water contents resulted in lower strengths. It is thought possible that the addition of excessive amounts of water leads to an increase in void space or porosity which produces the reduced strengths obtained.

It was also found that the inclusion of 5% of a kaolinite clay mineral produced an increase in the rate of gain of strength with age. The workability of the sample during compaction was also improved.

EXAMPLE VII

The procedure of Example V was repeated using a variety of waste materials as filler. These fillers were as follows:

(a) Red Mud (RM)—as previously described (b) Spent Shale (SS)—oil refinery shale after retorting (c) Fly Ash (FA)—obtained from coal fired power generation boilers (d) Blast Furnace Slag (BFS)—obtained from the BHP Steel Works.

(e) Soil (OS)—from the Condoblin region of New South Wales.

The results obtained were as follows:

| Physical Properties |  | Industrial Waste Based Products (No Fibre Added) |  |  |  |  | Requirement for physical Properties of the Ceramic House Brick and ordinary Portland Cement | |
|---|---|---|---|---|---|---|---|---|
|  |  | BFS | RM | SS | FA | OS | Ceramic House Brick (Normal) Weather Grade) Fired at 1010° C. | Ordinary Portland Concrete Water w/c = 0.5 |
| Compressive | 7 days | 31 | 31 | 14 | 18 | 26 | 12-14 | 25-27 |
| Strength | 14 days | 36 | 32 | 17 | 23 | 27 | — | — |
| (MPa) | 28 days | 39 | 35 | 21 | 23 | 29 | — | 35-40 |
| Density (g/cc) |  | 2.08 | 1.83 | 1.81 | 1.72 | 1.78 | 1.9-2.3 | 3.3-5.0 |

EXAMPLE VIII

The procedure of Example 1 was repeated with the following formulations and results:

(a)

-continued

| Blast Furnace Slag | 55% | |
| Rice Husks Ash - FeCl$_3$ | 20% | |
| Lime | 25% | |
| Compressive Strength (MPa) | | |
| No Fibre Added | 7 days | 31 |
| | 28 days | 39 |
| 1.5% Metal Fibre | 7 days | 33 |
| | 28 days | — |
| 1.5% Glass Fibre | 7 days | 33 |
| | 28 days | — |
| Density (g/cc) | 2.08 | |

(b)

| Spent Shale | 55% | |
| Rice Husks Ash - FeCl$_3$ | 20% | |
| Lime | 25% | |
| Compressive Strength (MPa) | | |
| No Fibre Added | 7 days | 14 |
| | 28 days | 28 |
| 1.5% Metal Fibre | 7 days | 20 |
| | 28 days | — |
| 1.5% Glass Fibre | 7 days | 26 |
| | 28 days | — |
| Density (g/cc) | 1.81 | |

(c)

| Red Mud | 30% | |
| Rice Husks Ash - FeCl$_3$ | 30% | |
| Lime | 40% | |
| Compressive Strength (MPa) | | |
| No Fibre Added | 7 days | 31 |
| | 28 days | 35 |
| 1.5% Metal Fibre | 7 days | 34 |
| | 28 days | — |
| 1.5% Glass Fibre | 7 days | 32 |
| | 28 days | — |
| Density (g/cc) | 1.83 | |

(d)

| Fly Ash | 55% | |
| Rice Husks Ash - FeCl$_3$ | 20% | |
| Lime | 25% | |
| Compressive Strength (MPa) | | |
| No Fibre Added | 7 days | 18 |
| | 28 days | 23 |
| 1.5% Metal Fibre | 7 days | 17 |
| | 28 days | — |
| 1.5% Glass Fibre | 7 days | 20 |
| | 28 days | — |
| Density (g/cc) | 1.73 | |

EXAMPLE IX

The procedure of Example I was repeated with the following formulations, various chemical additives and grinding hours. The results are given below:

(a)

| Blast Furnace Slag | 55% |
| Rice Husk Ash-FeCl$_3$ | 20% |
| Lime | 25% |

| | Density (g/cc) | | Compressive Strength (Mpa) | | |
|---|---|---|---|---|---|
| | 7 Days Cure | 28 Days Cure | 7 Days Cure | 28 Days Cure | Grinding Hours |
| 2.5% CaSO$_4$.2H$_2$O (By Weight) | 2.11 | 2.03 | 28.5 | 24.45 | 15 |
| 2.5% Tri-Mg$_2$O$_8$Si$_3$ 2H$_2$O (By Weight) | 2.10 | 2.05 | 24.0 | 26.0 | 15 |
| 2.5% Al$_2$(SO$_4$)$_3$ (By Weight) | 2.09 | 2.07 | 21.0 | 30.0 | 15 |
| 2.5% H$_3$PO$_4$ (*85%) (By Weight) | 2.11 | 2.08 | 10.0 | 20.5 | 15 |

(b)

| Red Mud | 55% |
| Rice Husk Ash-FeCl$_3$ | 20% |
| Lime | 25% |

| | Density (g/cc) | | Compressive Strength (Mpa) | | |
|---|---|---|---|---|---|
| | 7 Days Cure | 28 Days Cure | 7 Days Cure | 28 Days Cure | Grinding Hours |
| 2.5% CaSO$_4$.2H$_2$O (By Weight) | 2.08 | 2.03 | 33.0 | 36.0 | 15 |
| 2.5% Tri-Mg$_2$O$_8$Si$_3$ 2H$_2$O (By Weight) | 2.07 | 2.01 | 39.0 | 43.0 | 15 |

(c)

| Blast Furnace Slag | 25% |
| Red Mud | 30% |
| Rice Husk Ash-FeCl$_3$ | 20% |
| Lime | 25% |

| | Density (g/cc) | | Compressive Strength (Mpa) | | |
|---|---|---|---|---|---|
| | 7 Days Cure | 28 Days Cure | 7 Days Cure | 28 Days Cure | Grinding Hours |
| 2.5% Na$_2$CO$_3$ (By Weight) | 2.00 | 2.01 | 30.0 | 28.0 | 15 |
| 2.5% KAl(SO$_4$)$_2$ (By Weight) | 2.00 | 1.98 | 22.0 | 24.0 | 15 |
| 1.5% Metal Fibre + 1.5% Tri-Mg$_2$O$_8$Si$_3$ 2H$_2$O | 2.06 | 2.01 | 36.0 | 38.0 | 15 |

(d)

| Red Mud | 55% |
| Rice Husk Ash-FeCl$_3$ | 20% |
| Lime | 25% |

| | Density (g/cc) | | Compressive Strength (MPa) | | |
|---|---|---|---|---|---|
| | 7 Days | 28 Days | 7 Days | 28 Days | Grinding Hours |
| 20% Sand (By Weight) | 1.97 | 1.97 | 26.0 | 34.0 | 15 |

EXAMPLE X

The procedure of Example VIII was repeated using a Harvard Miniature Compaction Mould at 60 kN Pressing. Dimensions of the standard cylindrical test specimen formed are height=79.0 mm and diameter=38.5 mm.

The moulded specimens were kept in plastic bags and then cured in an oven dryer at a temperature of 35° C. for 28 days. The compressive strength was determined, based on ASTM C39 (Dry and Wet) and the tensile strength was also determined, based on ASTM C496 (Dry and Wet).

Test 1: Autoclave

Each test cylinder was steam-saturated in the autoclave. The pressure of the saturated steam was raised to a gauge of 18 kPa which corresponds to a temperature of 120° C. These specimens were remained for 2 hours at 18 kPa. The compression and the splitting tensile strength were then determined.

Test 2: Water absorption

The following procedure was based for determination of water absorption.

The specimens were weighed;
(i) as cured,
(ii) dried at 105° C.,
(iii) soaked in water for 24 hours, (iv) boiled in water for 2 hours
(v) dried at 105° C.,
(vi) dried at ambient temperature.

Test 3: Durability

A durability assessment was carried out using a "Weatherability" procedure suggested in "Concrete Technology and Practice" by W. H. Taylor (3rd Edition, published by Angus and Robertson, 1969).

Each test cylinder was given twenty cycles of:
(i) 8 hours in 60° C. laboratory drying oven,
(ii) 16 hours in 20° C. water (the soaking water being re-used).

After the 20 cycles, the compressive strengths of the cylinders (after 72 hours soaking) were determined.

The physical properties obtained are given in Table 1.

TABLE 1

| Formulations | | | Density (g/cc) | Compression (MPa) | | | Tensile (MPa) | | | Modulus (GPa) |
|---|---|---|---|---|---|---|---|---|---|---|
| | | | | Cured | Soaked in water | Auto-claved | Cured | Soaked in water | Auto-claved | |
| BFS | 55% | No Added | 1.86 | 25.0 | 17.4 | 27.0 | 2.6 | 1.64 | 2.45 | 1.27 |
| RHAF | 20% | 1.5% Fibre | 1.90 | 24.5 | — | 26.0 | 2.8 | — | 2.53 | — |
| LIME | 25% | 1.5% Metal | 1.89 | 25.7 | — | 27.8 | 3.2 | — | 3.38 | — |
| RM | 55% | No Added | 1.95 | 39.5 | 35.3 | 38.0 | 4.1 | 3.36 | 3.66 | 1.95 |
| RHAF | 20% | 1.5% Fibre | 2.01 | 32.8 | — | 26.9 | 3.3 | — | 3.20 | — |
| LIME | 25% | 1.5% Metal | 2.03 | 27.8 | — | 32.2 | 2.8 | — | 3.26 | — |
| FA | 55% | No Added | 1.47 | 19.0 | 16.2 | 22.0 | 2.3 | 1.91 | 2.74 | 1.09 |
| RHAF | 20% | 1.5% Fibre | 1.51 | 21.0 | — | 24.9 | 2.6 | — | 3.11 | — |
| LIME | 25% | 1.5% Metal | 1.55 | 23.5 | — | 26.0 | 2.6 | — | 3.22 | — |
| BS | 55% | No Added | 1.76 | 22.0 | 18.1 | 28.0 | 2.3 | 1.50 | 2.96 | 1.47 |
| RHAF | 20% | 1.5% Fibre | 1.77 | 28.5 | — | 32.2 | 3.0 | — | 3.28 | — |
| LIME | 25% | 1.5% Metal | 1.81 | 29.0 | — | 36.8 | 2.8 | — | 3.46 | — |
| SSP | 55% | No Added | 1.65 | 28.0 | 22.8 | 32.0 | 3.60 | 3.18 | 3.89 | 1.35 |
| RHAF | 20% | 1.5% Fibre | 1.68 | 26.0 | — | 32.5 | 2.72 | — | 3.43 | — |
| LIME | 25% | 1.5% Metal | 1.66 | 28.9 | — | 33.6 | 2.65 | — | 3.71 | — |

| Formulations | | | Density (g/cc) | Water Absorption (%) | | | | Durability | |
|---|---|---|---|---|---|---|---|---|---|
| | | | | as cured | Soaked in water for 24 Hrs. | Boiled in water for 2 Hrs. | dried at room temperature | Compression (MPa) | Modulus (Gpa) |
| BFS | 55% | No Added | 1.86 | 15.0 | 21.6 | 24.4 | 6.6 | 18.1 | 1.7 |
| RHAF | 20% | 1.5% Fibre | 1.90 | — | — | — | — | — | — |
| LIME | 25% | 1.5% Metal | 1.89 | — | — | — | — | — | — |
| RM | 55% | No Added | 1.95 | 27.2 | 35.6 | 37.4 | 8.4 | 23.8 | 1.8 |
| RHAF | 20% | 1.5% Fibre | 2.01 | — | — | — | — | — | — |
| LIME | 25% | 1.5% Metal | 2.03 | — | — | — | — | — | — |
| FA | 55% | No Added | 1.47 | 14.8 | 29.4 | 35.3 | 14.6 | 22.7 | 1.6 |
| RHAF | 20% | 1.5% Fibre | 1.51 | — | — | — | — | — | — |
| LIME | 25% | 1.5% Metal | 1.55 | — | — | — | — | — | — |
| BS | 55% | No Added | 1.76 | 14.7 | 23.6 | 27.3 | 8.9 | 16.5 | 1.5 |
| RHAF | 20% | 1.5% Fibre | 1.77 | — | — | — | — | — | — |
| LIME | 25% | 1.5% Metal | 1.81 | — | — | — | — | — | — |
| SSP | 55% | No Added | 1.65 | 23.7 | 18.5 | 36.1 | — | 15.3 | 1.3 |
| RHAF | 20% | 1.5% Fibre | 1.68 | — | — | — | — | — | — |
| LIME | 25% | 1.5% Metal | 1.66 | — | — | — | — | — | — |

BFS: Blast Furnace Slag,
RM: Rod Mud,
FA: Fly Ash,
BS: Burned Soil,
SSP: Spent Shale Product,
RHAF: Rice Husk Ash with FeCl$_3$,
LIME: Ca(OH)$_2$ It will be recognised by persons skilled in the art that numerous variations and modifications may be made to the invention as described above without departing from the spirit or scope of the invention as broadly described.

What we claim is:

1. A building material comprising from 20 to 70% of a reactive amorphorous silicate material obtained by combusting a combustible silica containing material which has been reacted with an aqueous solution of an iron salt, from 20 to 60% by weight of a filler containing reactives polyvalent cations, from 10 to 50% by weight of lime and from 0 to 10% by weight of reinforcing fillers.

2. A building material according to claim 1 wherein the reactive amorphous silicate is present in an amount of from 20 to 30%.

3. A building material according to claim 1 wherein the reactive amorphous silicate is obtained by burning rice husks.

4. A building material according to claim 1 wherein the filler containing polyvalent cations is present from 30% to 55%.

5. A building material according to claim 4 wherein the filler is selected from any one of soils, red mud derived from the processing of bauxite, kaolin, spent oil shale, fly ash, blast furnace slag or combinations thereof.

6. A building material according to claim 1 wherein the lime is present from 20 to 30%.

7. A building material according to claim 1 wherein the reinforcing fillers are present from 1.5 to 2% based on the dry matter content.

8. A building material according to claim 7 wherein the reinforcing fillers are selected from any one of steel fibres, glass fibres, cellulose, mineral wool, ceramic wool, glass wool or combinations thereof.

9. A building material according to claim 8 wherein the fibers are alkaline resistant glass rovings of a filament diameter of 10 to 12 microns and coarse grade steel fibres chopped to lengths of from ¼" to ½".

10. A method of producing a building material comprising the steps of:
 (a) treating a combustible silica containing material with an aqueous solution containing at least 0.5% by weight of an iron salt,
 (b) then causing combustion of the silica containing material by heating at a temperature of at least 400° C.,
 (c) then mixing together from 20 to 70% by weight of the combusted material obtained from step (b) with from 20 to 60% by weight of a filler containing a reactive polyvalent cation, from 10 to 50% by weight of lime and from 0 to 10% by weight of reinforcing filler,
 (d) adding sufficient water to dampen the mixture, and
 (e) compressing the mixture and allowing it to cure.

11. A method according to claim 10 wherein the combustible material is rice husk.

12. A method according to claim 10 wherein prior to mixing the filler is rendered reactive by heating to a temperature greater than 400° C.

13. A method according to claim 12 wherein the reinforcing fillers are added after the mixing of the other ingredients with water.

14. A method according to claim 13 wherein the water is added in the amount of from 35 to 40% based on the weight of the combusted material.

15. A building material produced by the method of claim 10.

* * * * *